Oct. 21, 1958

E. A. GREGG ET AL 2,856,672

APPARATUS FACILITATING THE CONTOURING
OF HONEYCOMB CORES STRUCTURES

Filed Jan. 10, 1956

INVENTORS:
Elmer A. Gregg
James E. Reddick

By Herbert E. Metcalf
Their Patent Attorney

Oct. 21, 1958
E. A. GREGG ET AL
2,856,672
APPARATUS FACILITATING THE CONTOURING
OF HONEYCOMB CORES STRUCTURES
Filed Jan. 10, 1956
2 Sheets-Sheet 2
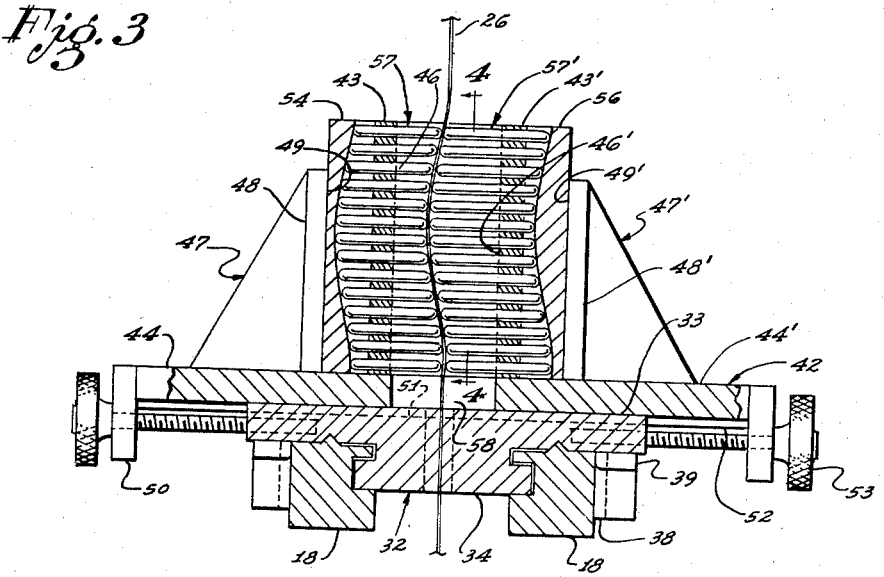
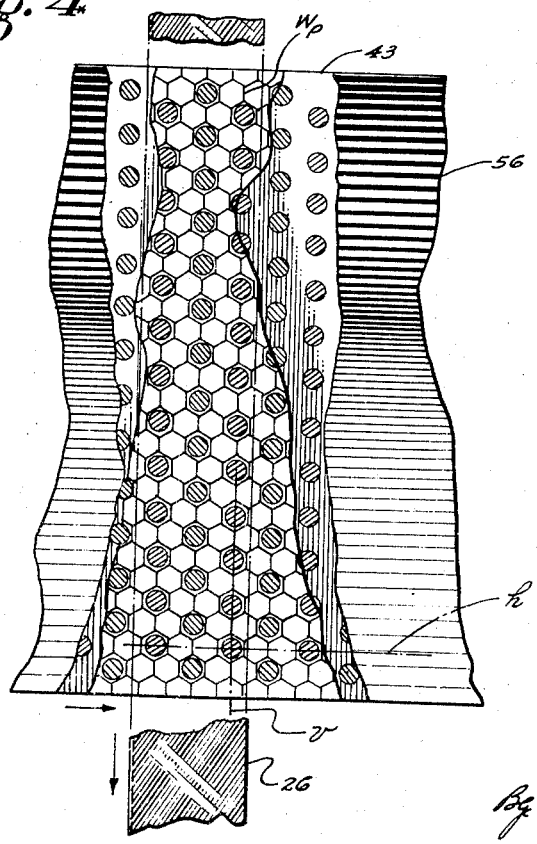
INVENTORS:
Elmer A. Gregg
James E. Reddick
By Herbert E. Metcalf
Their Patent Attorney

United States Patent Office 2,856,672
Patented Oct. 21, 1958

2,856,672
APPARATUS FACILITATING THE CONTOURING OF HONEYCOMB CORES STRUCTURES

Elmer A. Gregg, Gardena, and James E. Reddick, Torrance, Calif., assignors to Northrop Aircraft, Inc., Hawthorne, Calif., a corporation of California Application January 10, 1956, Serial No. 558,298

5 Claims. (Cl. 29—68)

This invention relates to apparatus facilitating the fabrication of honeycomb core structures and more particularly to apparatus having utility in sculpturing the outer surfaces of honeycomb core structures.

Structural members incorporating honeycomb core construction are increasing in popularity as compared to other similar known types of construction due to the many inherent gainful advantages of the former type of construction. The above is particularly true in the aircraft industry where honeycomb cores are utilized in the construction of leading and trailing edges of airfoils, control surface members, fuselage sections, etc. This type of construction provides components having an extremely low weight-to-strength ratio which is of paramount importance in the aircraft industry.

Numerous fabrication techniques have been advanced to accomplish the sculpturing of honeycomb cores, however, these known techniques are expensive, time consuming, and in general leave much to be desired. The foregoing is especially so if the sculptured cores are to be produced in production quantities.

In the technique disclosed herein a plurality of opposing pins are caused to enter a predetermined number of the individual cells of a honeycomb core workpiece. The inner ends of these pins are hardened and cooperate to provide support for the core and guiding surfaces for a continuous knife-like blade. The blade in turn cuts the honeycomb core and provides it with the desired contoured surface in a manner which will become more apparent as the disclosure progresses.

Accordingly it is an object of the present invention to provide apparatus facilitating the contouring of the surfaces of honeycomb core structures.

Another object is to provide apparatus facilitating the contouring of the surfaces of honeycomb core structures which does not require the use of a filler to provide cell support during the sculpturing operation.

Another object is to provide apparatus facilitating the contouring of the surfaces of honeycomb core structures which does not require the use of soluble binding or other similar agents to secure the workpiece to an operating surface.

Another object is to provide apparatus facilitating the contouring of the surfaces of honeycomb core structures which is simple in design and construction, which is economical to manufacture, and which is substantially foolproof in operation.

Although the characteristic features of the invention will be particularly pointed out in the appended claims, the invention itself, and the manner in which it may be carried out, may be better understood by referring to the following description taken in connection with the accompanying drawings forming a part of this disclosure, and in which:

Figure 3 is a section view of the apparatus shown in Figure 1 taken along the line 3—3 thereof, background structure has been omitted for purposes of clarity.

Figure 4 is a fragmentary sectional view as indicated by the sectional line 4—4 of Figure 3.

Figure 1:
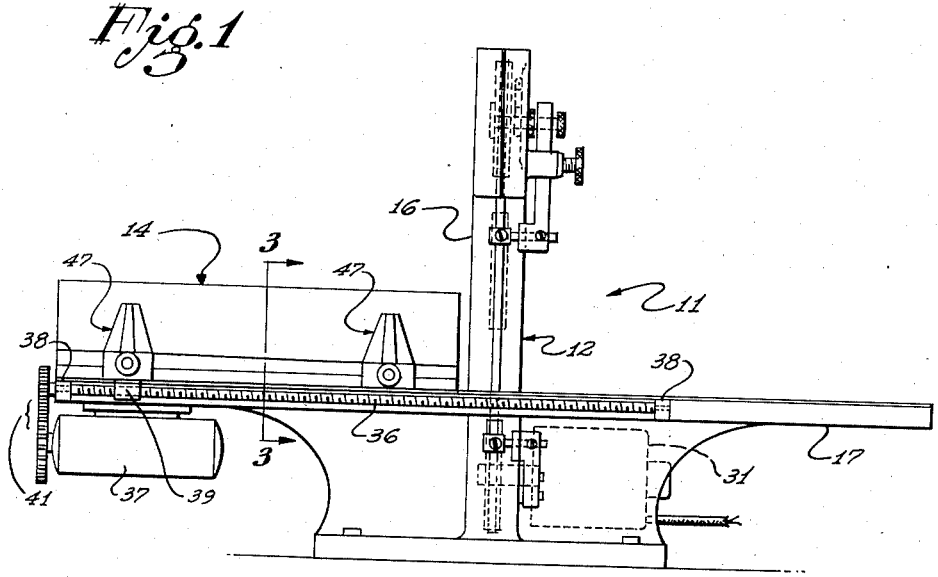
Figure 1 is a side elevational view of the contouring apparatus as disclosed herein.

Referring to the drawings, Figure 1 shows a type of contouring apparatus 11 as disclosed herein and which includes a frame structure 12 and a holding fixture 14.

Figure 2:
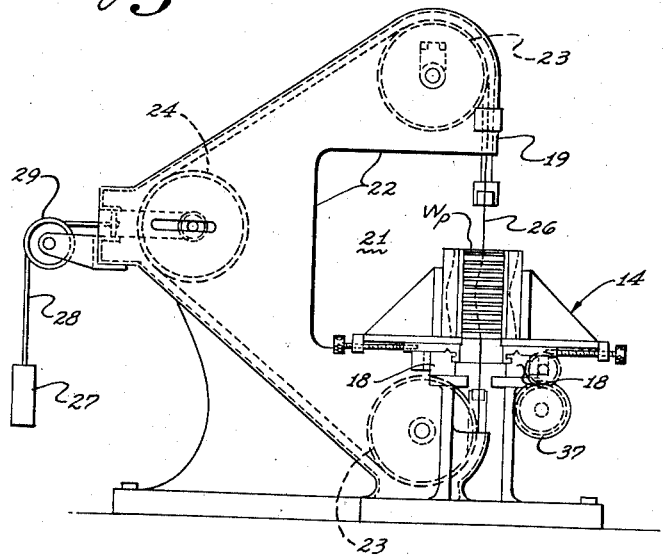
Figure 2 is an end elevational view of the apparatus shown in Figure 1.

The structure 12 rests on and is secured to suitable supporting structure by means of bolts, lag screws, or the like. The structure includes a vertical upstanding body portion 16 and a bed plate portion 17 consisting of a pair of horizontally positioned guideways 18 (Figure 3) extending throughout the length of the portion 17. As viewed in Figure 2, the portion 16 assumes a shape generally resembling an equilateral triangle having one edge 19 positioned normal to the ways 18 and if the side was continuous would pass therebetween at approximately their midpoint. A throat 21, defined by inner portions 22 of the portion 16, is provided in the portion 16 and opens to the edge 19. The throat 21 is sufficiently large to allow the fixture 14 to travel along the ways 18 and pass through the throat 21 with a honeycomb workpiece $W_p$ mounted in the fixture 14. The honeycomb workpiece $W_p$ may be fabricated from aluminum, copper, steel, cardboard, cloth or other suitable materials.

Receiving wheels 23, 23 and 24, on which a flexible continuous knife-like blade 26 is positioned, are rotatably mounted adjacent the apices of the portion 16. The wheel 24 is also mounted for horizontal sliding bi-directional movement. The wheel 24 is continuously urged in a direction generally away from the bed-plate portion 17 by a weight 27 and connecting cord 28, the latter in passing between the wheel 24 and weight 27 passes over a direction changing pulley 29. Mounting the wheel 24 in this manner continuously subjects the blade 26 to a constant tension regardless of the contour it may assume in passing through the workpiece $W_p$. Rotational movement is imparted to the wheels 23 and 24, and indirectly to the blade 26, by an electrical motor 31.

The fixture 14 includes a base member 32 having a plane upper surface 33 and a lower portion 34 shaped to mate with and move lengthwise on the ways 18. Lengthwise or longitudinal movement is imparted to the member 32, with respect to the ways 18, by means of a pair of threaded members 36 and a variable speed reversible type motor 37. The threaded members are rotatably mounted, in a conventional manner, on respective ways 18 by means of lugs 38 extending therefrom. The threaded portion of the member 36 passes through threaded apertures formed in lugs 39 depending from the member 32. A gear train 41 transmits movement of the motor 37 to the threaded members 36 causing the member 32 to move along the ways 18 as desired by an operator.

Mounted on the upper surface of the base member 32 is a pair of angular members 42. These members are of identical construction, therefore, a description of the left-hand member (Figure 3) will also be applicable to the right-hand member. The left-hand member 42 consists of a rectangular backing plate 43 superimposed on a rectangular base plate 44. In the aforementioned superimposed position, a side face 46 of the plate 43 is in flush relationship with a side edge of the base plate 44, also the face 46 is normal to the side faces of the plate 44. A pair of bracket members 47 are fixedly secured in spaced longitudinal relation on the plate 44. An upstanding plate 48, of each of the brackets 47, has a face 49 which is parallel to and spaced from the face 46 of the plate 43. The faces 49 of respective pairs of brackets 47 are also in longitudinal parallel alignment. The same numerals as those used in connection with left-hand member 42 with the addition of a prime, have been used to identify corresponding component parts of the right-hand member 42.

A pair of grooves 51, each of which are T-shaped in cross-section, are formed in the base member 32 and extend in a direction normal to the length of the ways 18. Feet 52, which are also T-shaped in cross-section, depend from the lower surface of the plate 44 and are receivable in the grooves 51. Threaded adjusting members 53 are pivotally mounted in a conventional manner in lugs 50 depending from side edges of the plate members 44 and 44'. The threaded portion of the members 53 mate with threaded bores formed in the base member 32.

In the assembled position of the angular members 42 on the base member 32 it will be noted the opposing faces 46 and 46' of the plates 43 and 43', respectively, have a parallel relationship. Further it will be noted that the angular members 42 may be moved toward or away from each other by rotating the members 53 in the proper direction. Also the fixture 14 may be moved bi-directionally along the ways 18 according to the direction of rotation of the motor 37.

Mounted between the upstanding plates 43 and 48 and 43' and 48' are master concave and convex contour pattern plates 54 and 56, respectively. The contoured faces of the plates 54 and 56 constitute mating surfaces while their back surfaces are plane and contact the surfaces 49 and 49' of the plates 48 and 48', respectively. The contoured faces of the plates 54 and 56 are identical with the contoured surface to be formed on the workpiece $W_p$.

Extending through apertures provided in the plates 43 and 43', in a normal direction with respect to the side faces 46 and 46' of these plates, are respective sets of pins 57 and 57'. All of the pins of each set are circular in cross-section, they are all equal in diameter, and all pins are provided with identical semi-spherical end portions. The set of pins 57 pass through the apertures formed in the plate 43 and have a snug sliding fit therein, also the set of pins 57' pass through the apertures formed in the plate 43' and also have a snug sliding fit in the latter apertures. As viewed in Figure 3, all the pins constituting the set of pins 57 are of equal length and all of the pins constituting the set of pins 57' are also of equal length. It will be apparent that the set of pins identified by the numeral 57 may but need not necessarily be of the same length as the pins identified by the numeral 57'. Therefore it will be apparent that at such time as the respective angular members 42 are moved sufficiently close together the semi-spherical ends of corresponding pins will be in abutting relationship. Also if the bracket members 42 are backed-off slightly, that is from the position just described, their previously abutting ends will then provide clearance for the knife blade 26. Therefore during a contouring operation it will be apparent that all the pins of the set 57 are located on one side and all the pins of the set 57' are located on the other side of the blade 26.

The pattern for the above sets of pins may vary considerably, however, they necessarily must be positioned in a manner to provide sufficient support for the workpiece $W_p$ and a proper guiding surface for the blade 26. A typical arrangement which the pins may assume is shown in Figure 4. It is to be understood that the arrangement of pins in one of the plates 43 or 43' is a mirror image of the pins in the other plate, in other words respective abutting pins are in axial alignment. Considering the horizontal and vertical rows $h$ and $v$, respectively, defined by the individual cells of the workpiece $W_p$ it will be seen that an individual pin need not enter each of the individual cells of the workpiece. Rather they may be spaced to enter every third and second cell along the lines $h$ and $v$, respectively. The pins spaced in this manner will provide sufficient support for and impart rigidity to the workpiece and also provide proper guiding surfaces for the blade 26 during a contouring operation. With this arrangement of pins the blade 26 will continuously be in contact with a predetermined number of pins at all times during the operation except when the blade is entering or leaving the workpiece.

The blade 26 does not constitute a conventional bandsaw blade but rather an extremely flexible knife blade or the like. The cutting edge of the blade may have serrations formed therein which are devoid of any set or its leading edge may be coated with an abrasive material. The abutting ends of each set of pins are heat-treated to provide an extremely hard surface, alternately the pins may be provided with Carboloy or Stellite tips.

A more complete understanding of the contouring apparatus described herein will be forthcoming from the following discussion of its operation.

The angular members 42 are first spaced a suitable distance apart. Contour plates 43 and 43' are selected and placed in the proper position in the members 42. The workpiece $W_p$ is then positioned between the plates 43 and 43' with the individual cells thereof extending laterally, that is in the same direction as the axes of each set of pins. A filler plate (not shown) may be placed between the plates 44 and 44', that is in the space indicated by the numeral 58 in Figure 3, to elevate the workpiece $W_p$ if desired. This filler plate is subsequently removed before a contouring operation is performed.

The members 42 are then urged toward each other by rotation of the members 53. This movement causes the opposing sets of pins 57 and 57' to enter predetermined individual cells of the workpiece $W_p$. The above movement of the brackets 42 is continued until the inner ends of opposing pins are in contacting abutting relationship. The brackets are then backed off sufficiently to provide sufficient clearance and a guideway for the cutting blade 26 to pass between the respective adjacent abutting ends of the sets of pins 57 and 57'.

The blade 26 is precontoured to mate with the outermost contour defined by the respective sets of pins 57 and 57' by means of a blade contouring fixture (not shown), that is the blade 26 is curved so that it will properly enter the aforementioned guideway without damage to the sets of pins 57 and 57'. The motor 37 is then energized to move the workpiece into contact with the cutting edge of the blade 26. As soon as the blade has entered the workpiece the abutting ends of the respective sets of pins 57 and 57' guide the blade causing it to follow the proper contour.

Upon completion of a first cut the brackets 42 are backed away from each other thereby freeing the workpiece from the abutting pins. The workpiece may now be reversed, that is turned end for end, and the above operation repeated. This procedure will provide a sculptured honeycomb core having identical convex contoured surfaces. If surfaces of different contour are required on the opposite surfaces of the finished core it will be apparent that the original contour plates 54 and 56 will be removed after the first cut and plates having the proper contour substituted therefor. In making the second cut the two core pieces resulting from the first cut will mate with each other and provide suitable back-up material while the second cut is being made.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Apparatus for contouring the surfaces of honeycomb core structures, comprising: a supporting structure including a base plate which defines an upper horizontal plane surface and in which said base plate is mounted on said structure for movement thereon through a predetermined range; a flexible continuous knife-like blade; means operationally mounting said blade on said structure with one run thereof passing through said base plate in a direction generally normal to said plane surface; a pair of shaped plates each having a contoured face and which are adjustably and movably mounted on said plane surface on opposite sides of said blade with said contoured faces in opposed relation; a pair of plane plates mounted in opposed relation on said plane surface on opposite sides of said blade and between said pair of shaped plates; and a set of pins mounted in and extending through each of said plane plates with the most adjacent ends of said pins opposing each other.

2. Apparatus as set forth in claim 1: further characterized in that each of said set of pins constitute a plurality of individual pins of cylindrical configuration and each set of pins are mounted in a respective one of said pair of plane plates in corresponding and predetermined positions whereby the individual pins of each set of pins are in axial alignment.

3. Apparatus as set forth in claim 1: further characterized in that the respective contoured faces of said shaped plates constitute mating surfaces.

4. Apparatus as set forth in claim 3: further characterized in that each of said set of pins constitute a plurality of individual pins of cylindrical configuration and each end portion of each individual pin is of semispherical configuration.

5. Apparatus as set forth in claim 4: further characterized in that all individual pins constituting one of said set of pins are of equal length and the individual pins constituting the other set of pins are also all of equal length.

References Cited in the file of this patent

UNITED STATES PATENTS

| | | |
|---|---|---|
| 483,094 | Ansted | Sept. 20, 1892 |
| 535,088 | Atkinson | Mar. 5, 1895 |
| 928,353 | Bissell | July 20, 1909 |
| 2,687,150 | Beamish | Aug. 24, 1954 |
| 2,754,858 | Davis | July 17, 1956 |

FOREIGN PATENTS

| | | |
|---|---|---|
| 8,622 | Great Britain | of 1901 |